United States Patent [19]

Nigam

[11] Patent Number: 4,984,103
[45] Date of Patent: Jan. 8, 1991

[54] METHOD FOR READING/WRITING FOR A FLOPPY DISC DRIVE WITH BUFFER MEMORY

[75] Inventor: Anil K. Nigam, Cupertino, Calif.

[73] Assignee: Fujitsu America, Inc., San Jose, Calif.

[21] Appl. No.: 332,023

[22] Filed: Mar. 30, 1989

Related U.S. Application Data

[62] Division of Ser. No. 130,104, Dec. 7, 1987, Pat. No. 4,933,795.

[51] Int. Cl.$^5$ .................. G11B 19/20; G11B 5/09
[52] U.S. Cl. .................. 360/074.100; 360/66; 360/69; 360/121; 360/75
[58] Field of Search .................. 360/69, 71–72.2, 360/73.03, 74.1, 74.4, 75, 77.02, 78.01, 78.04, 86, 97.01, 98.01, 99.01, 48, 51, 57, 66

[56] References Cited

U.S. PATENT DOCUMENTS

| 4,584,617 | 4/1986 | Libove et al. | 360/39 |
| 4,644,421 | 2/1987 | Miwa et al. | 360/66 |
| 4,805,051 | 2/1989 | DeMarco et al. | 360/78.01 |

FOREIGN PATENT DOCUMENTS

| 54-131833 | 10/1979 | Japan | 360/97.01 |
| 55-4731 | 1/1980 | Japan | 360/69 |

Primary Examiner—Aristotelis M. Psitos
Assistant Examiner—Steven R. Garland
Attorney, Agent, or Firm—Staas & Halsey

[57] ABSTRACT

A method for writing and reading for a floppy disc drive using a read/write head having a high density read/write gap and a low density read/write gap and a memory buffer. The method includes reading requested data and data ahead of the requested data from the disc and then storing the read data ahead of the requested data in a look-ahead memory buffer. Data stored in the look-ahead memory buffer is then read, instead of from the disc, when the next requested data is the same as the data stored in the memory buffer. There is no movement of the disc until reading of the data stored in the memory buffer is completed or until other data is requested that is needed directly from the disc. The above method reduces power consumption and provided an improved higher rate of read/write operation for a floppy disc drive that is particularly useful in a portable computer.

6 Claims, 14 Drawing Sheets

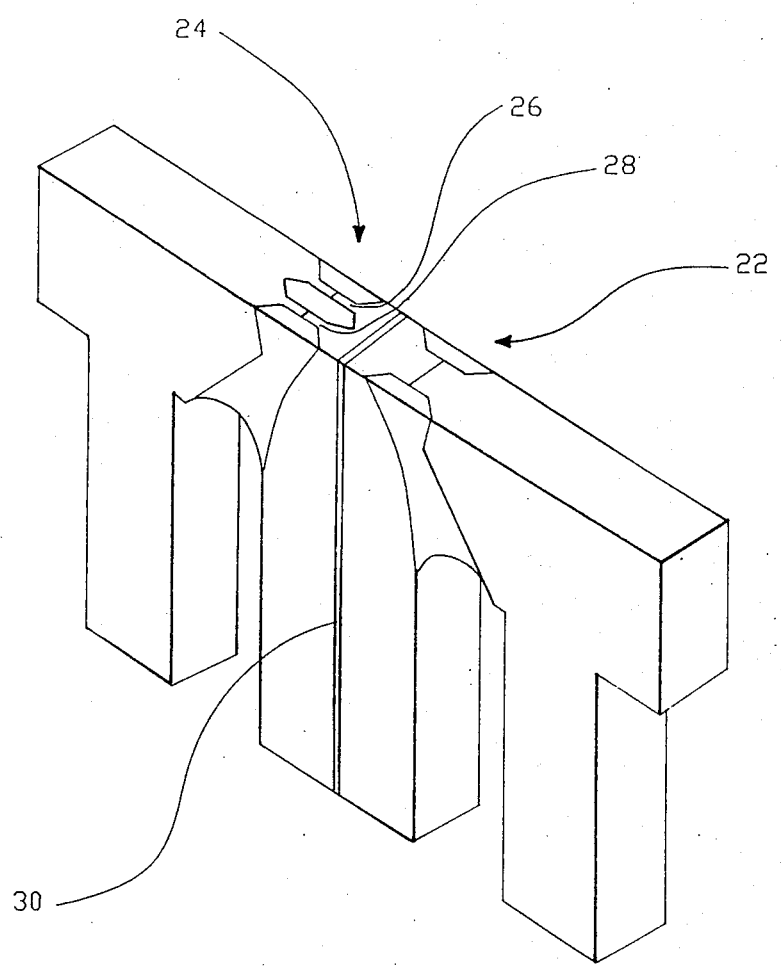
(PRIOR ART)
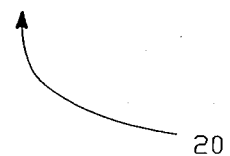

LOWER GAPS

UPPER GAPS

SERVO FORMAT DETECTOR CIRCUIT FLOWCHART

METHOD FOR READING/WRITING FOR A FLOPPY DISC DRIVE WITH BUFFER MEMORY

This is a division of Ser. No. 07/130,104, filed Dec. 7, 1987, now U.S. Pat. No. 4,933,795.

FIELD OF THE INVENTION

The present invention is related to floppy disc drives.

BACKGROUND ART

The current state of the art is to provide an open loop servo controlled floppy disc drive using standard formatted floppy diskette media which is interchangable among drives. Such disc drives are generally characterized as low density or capacity in order to accommodate the mechanical positioning errors inherent in such open loop system and still be able to read and write data.

High capacity floppy disc drives as well as hard disc drives rely on developing high areal densities through increased track density (tracks per inch, TPI) and increased bit density (bits per inch, BPI). However both of these approaches to achieve a higher capacity floppy disc drive would require increased positioning accuracies which can only be achieved through a closed loop servo system. The error feedback required for such a closed loop servo system can be developed by prerecording or servo writing information on the magnetic disc media at a manufacturing facility. The net result of this procedure is that a servo writer must be developed and that the media requires costly and time consuming handling in order to be preformatted specifically to cater to the servo system of the disk drive.

Further such high density systems with closed loop servo mechanisms are generally incompatible with the aforementioned open loop servo controlled, low density disc drives using standard formatted media. Thus the high density floppy disc drives are not able to write to the standard formatted disc media.

SUMMARY OF THE INVENTION

The present invention is directed to improving upon the disadvantages of the prior art.

The present invention is directed towards a high density floppy media disc drive having a closed loop servo system with a capability of read/write updating data recorded using a standard low density open loop disc drive.

It is an object of the present invention to provide a floppy disc drive having a read/write head incorporating a read/write slider which has a read/write high density gap and a read/write low density gap so that read and write operations can be accomplished for data in a high density format and also for data in a low density format.

The advantage of the above object is that the floppy disc drive of the invention can not only read and write new data in a high density mode but can also write update data which has been previously written on standard media using a low capacity disc drive. Furthermore, the drive can also generate low density media to maintain compatability with an installed base of low density drives.

It is another object of the present invention to provide for a servo format which can be field written onto the floppy media using the disc drive itself without the requirement that a specially designed servo writer in a factory environment be used to servo format the blank diskette media.

The advantage of the above object is that the cost requirement for first designing and developing a factory servo writer and then individually servo writing each diskette before it is shipped to a customer is eliminated. The servo writing is accomplished by the disc drive itself for each new diskette at the time the diskette is first put in service by the customer.

Another object of the present invention is to provide for a unique detection circuit for the servo signals which uses a single circuit instead of multiple parallel circuits in order to eliminate DC offset error. This detection circuit is also used to accomplish the appropriate servo writing.

Yet another object of the present invention is to provide for the read/write update of data recorded in a low density manner without the use of a standard erase gap which is found on low density open loop servo controlled floppy disc drives.

Accordingly, the present invention provides for a magnetic read/write head for a disc drive capable of both high density read/write operations as measured in tracks per inch and low density read/write operations as measured in tracks per inch, which head comprises a first slider, and a first magnetic high density read/write gap positioned on the first slider. The head further includes a first magnetic low density read/write gap positioned on the slider. A non-magnetic spacer separates the first magnetic high density read/write gap and the first magnetic low density read/write gap in order to prevent interference between the two gaps. No erase gap is incorporated in the slider of the present invention.

The present invention further includes a method for servo formatting disc media comprising the steps of establishing a first alignment pattern of transitions and a second alignment pattern of transitions. The method further includes establishing a data track having a centerline defined where a comparison determines the amplitude of the first pattern of transitions equals approximately the amplitude of the second pattern of transitions. The method further includes establishing a first timing decode pattern of transitions which preceeds the first alignment pattern of transitions, that has a centerline that is substantially colinear with the centerline of the first alignment pattern, and which first timing decode pattern is different from the first and second alignment patterns of transitions. The method further includes establishing a second timing decode pattern of transitions which preceeds the data track, which has a centerline which is substantially colinear with the centerline of the data track and which second timing decode pattern is different from the first and second alignment patterns of transitions and the first timing decode pattern of transitions. The method further includes establishing a third timing decode pattern of transitions which preceeds the second alignment pattern of transitions, and which has a centerline that is substantially colinear with the centerline of the second alignment pattern of transitions, and which third timing decode pattern is different from the first and second alignment patterns of transitions and from the first and second timing decode patterns of transitions.

The invention further includes an electronic circuit for detecting a servo format on a disc and for locating a data track wherein the servo format includes pluralities of patterns of alignment transitions for defining data tracks and pluralities of different patterns of time decode transitions. The electronic circuit includes a first detector and decoder for detecting and decoding the peaks of transitions of the pluralities of time decode transitions. The device further includes a second detector and sampler for detecting and sampling the peaks of transitions of the pluralities of patterns of alignment transitions in order to locate the data tracks. The electronic circuit further includes a third device for using the output of the first detector and decoder for determining when the second detector and sampler is to detect and sample the peaks of transitions of the pluralities of patterns of alignment transitions.

The invention additionally includes a method of field servo writing a disc in a disc drive using the read/write head of the drive including the steps of writing a first time decode pattern of transitions followed by a first alignment pattern of transitions. Then sampling the first alignment pattern and offsetting the read/write head radially a prescribed amount determined by the sampled amplitude of the first alignment pattern. Then writing a second timing decode pattern of transitions followed by an intermediate alignment pattern of transitions and sampling the intermediate pattern and offsetting the read/write head radially a prescribed amount determined by the sampled amplitude of the intermediate alignment pattern. Finally writing a third timing decode pattern of transitions followed by a second alignment pattern of transitions.

The invention further includes a method for write updating data provided on a disc by an open loop servo controlled disc drive with a head having a low density read/write gap and an erase gap, using a closed loop servo controlled disc drive having a read/write head with a low density read/write gap and a high density read/write gap including the step of moving the closed loop servo controlled low density gap to the centerline of a track containing the data to be updated. The method also includes the step of moving the servo controlled low density gap radially to one side of the track by the width of one erase gap and erasing the desired data. The method further includes the steps of moving this closed loop servo controlled low density gap radially by the width of two erase gaps toward the opposite side of the track and erasing the desired data. The method further includes a step of moving the closed loop servo controlled low density gap radially back one erase gap width to the centerline of the track and using the servo controlled low density gap to write update the data.

The invention also includes the method of reducing power consumption of a floppy disc drive in a portable computer including the steps of providing a read/write head capable of reading data on a disk and providing a look ahead memory buffer in the disc drive. The method further includes storing data in the look ahead memory buffer that is positioned ahead of the last requested data on the magnetic media read by the disc drive, and then ceasing movement of the disc until the data stored in the buffer memory is used or until other data is requested.

BRIEF DESCRIPTION OF THE FIGURES

FIG. 1 is a perspective view of a prior art slider for a low density read/write head depicting both a read/write gap and an erase gap.

DETAILED DESCRIPTION OF THE PREFERRED EMBODIMENT

Figure 2:
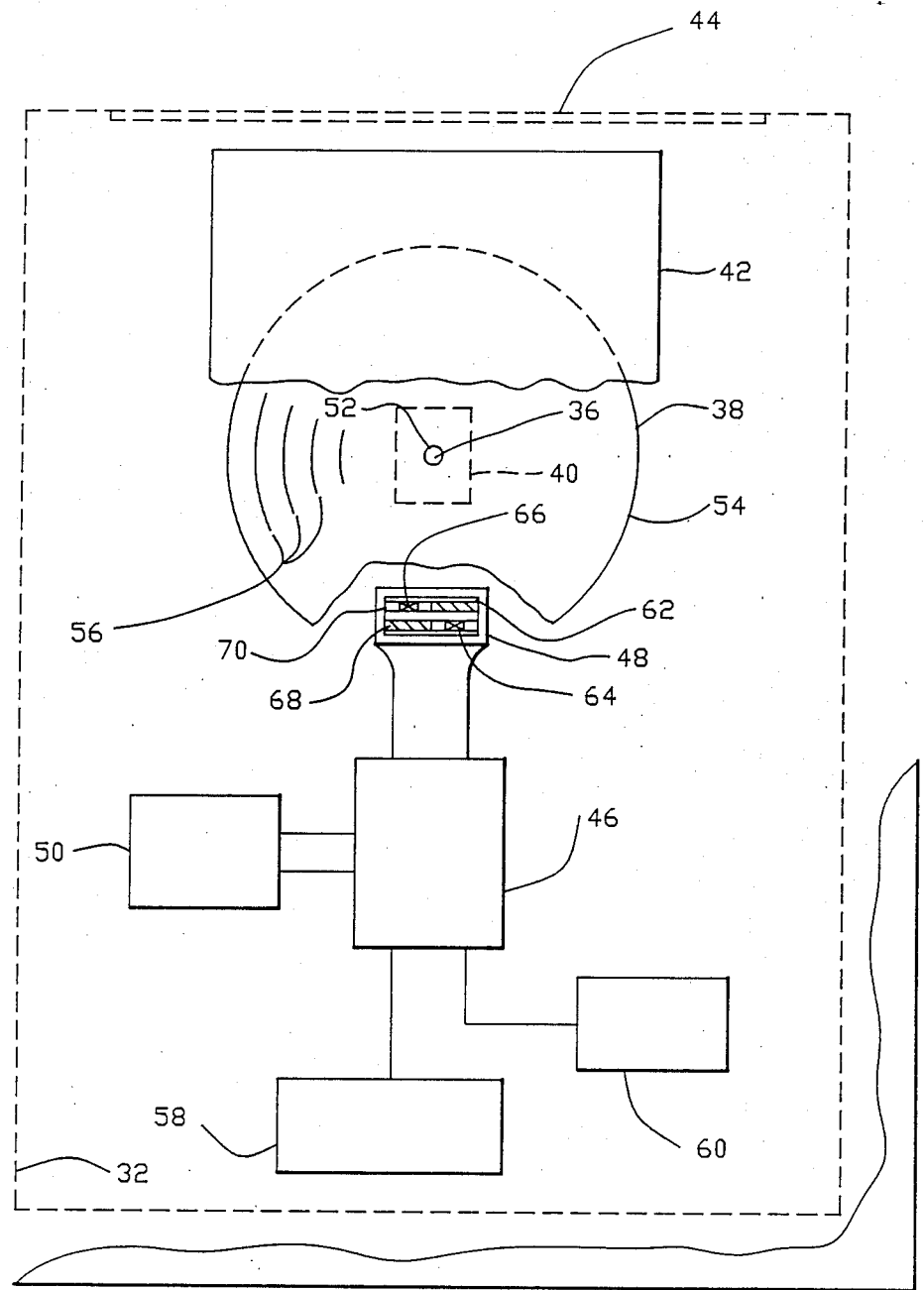
FIG. 2 is a view of an embodiment of a disc drive of the invention.

FIG. 1 depicts prior art floppy disc read/write head cores of the type used in low density floppy disc drives. These head cores are identified by the numeral 20. These head cores fit into head sliders which are used as part of a total head assembly. As can be seen in FIG. 1, a read/write gap 22 for low density reading and writing is depicted. Also depicted in FIG. 1 adjacent to the read/write gap 22 is an erase head 24 which has two erase gaps 26, 28. Separating the read/write gap 22 from the erase gaps 26, 28 is a non-metallic material 30. Even with the separation of the erase gaps 26, 28 from the read/write gap 22 by the non-metallic material 30, there is still magnetic interference between these gaps due to the large surface area with which one gap element core can see the other gap element core.

It is also to be understood that magnetic interference can occur between upper and lower heads. Thus in prior art floppy disc drives which include upper and lower head assemblies with upper and lower sliders having both erase gaps and read/write gaps, the read/write and erase gaps of the upper and lower heads are displaced laterally from each other in order to prevent magnetic interference of one core with another which is writing or reading data.

Head Design With High And Low Density Read/Write Gaps

An embodiment of the present floppy disc drive of the invention is shown in FIG. 2 and identified by the numeral 32. This disc drive 32 is positioned in a portable computer 230. The floppy disc drive 32 includes a housing 34 which includes a spindle 36 upon which a floppy disc 38 can be mounted. Spindle motor 40 rotates spindle 36 and disc 38. The disc 38 is itself housed in a cartridge or housing 42 which can be removably inserted into the housing 34 of the floppy disc drive 32 through door 44 so that the disc 38 may be positioned on the spindle 36.

The floppy disc drive 32 further includes a carriage 46 to which is mounted a lower head assembly 48. The carriage is controlled by the motor 50 which causes the carriage 46 and the lower head assembly 48 to move radially inwardly toward the inner diameter 52 located adjacent spindle 36 and outwardly toward the outer diameter 54. In doing so the head assembly 46 traverses radially tracks 56 which are magnetically laid down on the disc 38. These tracks 56 have recorded thereon both servo information and the data formats.

The floppy disc drive 32 further includes servo format detector circuitry 58 which will be described more fully hereinbelow and semiconductor look-ahead buffer memory 60. The lower head assembly 46 includes a lower slider 62. The lower slider 62 includes both a low density read/write gap 64 and a high density read/write gap 66 which is shown in greater detail in FIG. 3.

Figure 3:
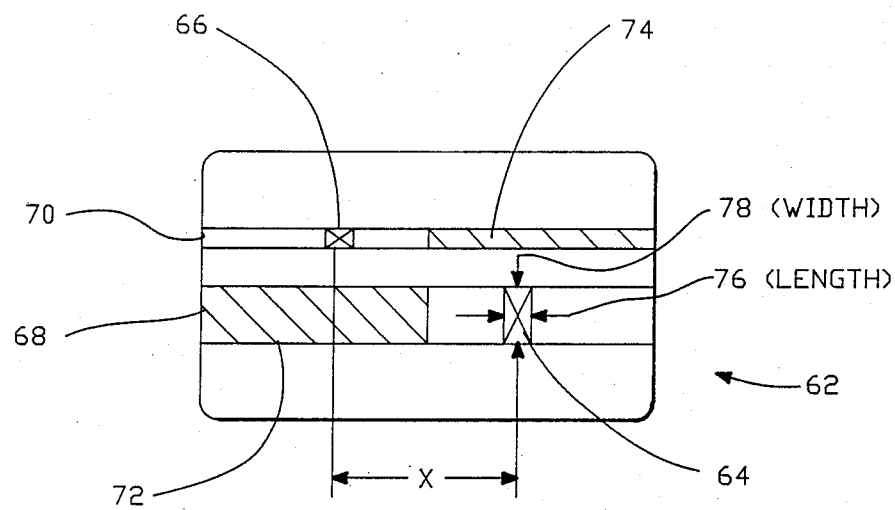
FIG. 3 is a view depicting a lower read/write slider of the invention having a high density gap and a low density gap.

As can be seen in FIG. 3, the low density gap 64 is placed on a first track 68 of the slider 62 while the high density gap 66 is placed on a second track 70 of the slider 62. The low density head 64 occupies about half of the first track 68 with the other half comprised of non-magnetic material 72. Similarly non-magnetic material 74 occupies approximately half of the second track 70. In FIGS. 2 and 3 it can be seen that tracks 68 and 70 are spaced radially from each other and that gaps 64 and 66 are spaced laterally or tangentially from each other in order to prevent magnetic interference between the two gaps. The designation of the gap length is shown at number 76 with the designation of the gap width is shown at number 78. It is to be understood that in this embodiment, that the gap length of both the high density and the low density gaps is the same and thus both can read and write the same number of bits per inch (BPI) circumferentially on each track 56 of the disc shown in FIG. 2. In other embodiments the gap lengths may be different. In a preferred embodiment, the gap width of the high density gap is approximately 0.036 millimeters while the gap width of the low density gap is approximately 0.126 millimeters. It is also to be understood that other combinations, orientations and numbers of high and low density gaps can be provided on each slider and fall within the scope of the invention.

Figure 4:
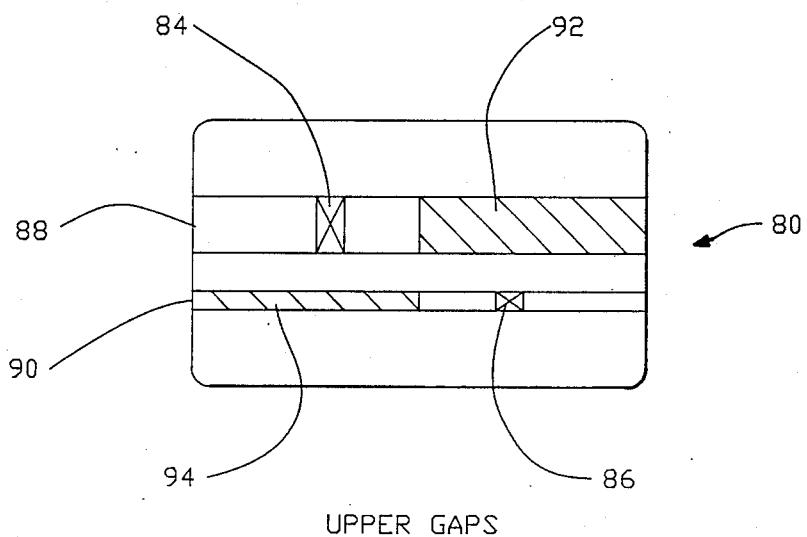
FIG. 4 is a view depicting an upper read/write slider of the invention having a high density gap and a low density gap.
Figure 5:
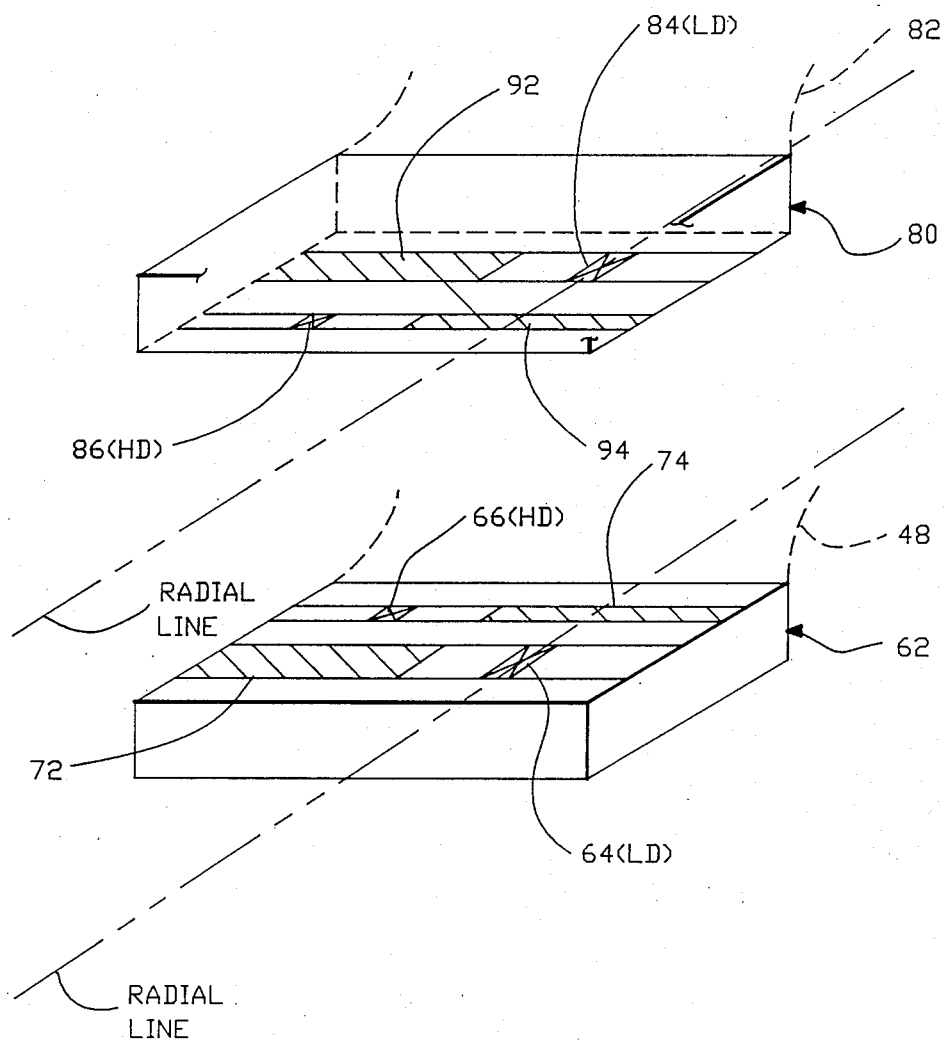
FIG. 5 is a perspective view of upper and lower sliders of the disc drive of the invention showing the orientation and positioning of the high and low density gaps with respect to each other.

FIG. 4 depicts an upper slider 80 which would be included in an upper head assembly such as assembly 82 in FIG. 5. The upper slider 80 includes a low density read/write gap 84 and a high density read/write gap 86 which are located on third and fourth tracks 88 and 90 respectively. As with the lower slider 62, approximately half of each of these tracks 88 and 90 are comprised of non-metallic material 92 and 94 respectively for all the reasons given herein above with respect to the avoidance of interference between read/write gaps.

Figure 6:
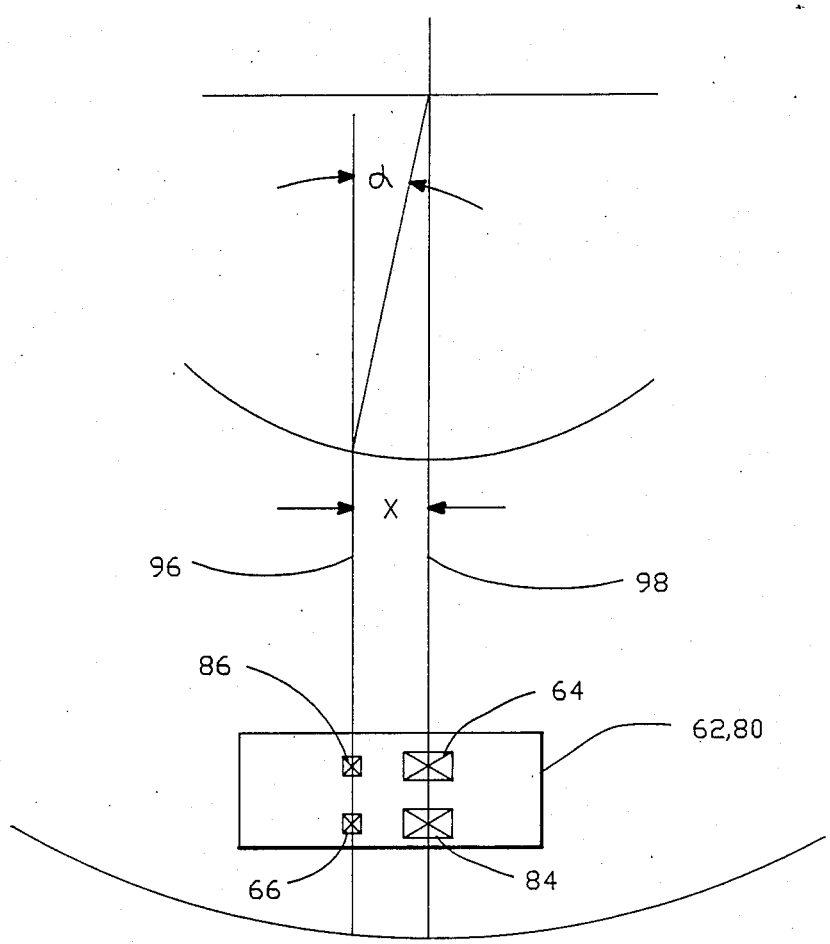
FIG. 6 is a depiction of the orientation of the high and low density gaps of the slider of the invention relative to a radial line of disc media.

FIGS. 5 and 6 show the upper and lower sliders 62, 80 and the associated high and low density gap disposed with respect to each other. As can be seen in FIG. 5, the lower density gap 84 of the upper slider 80 is positioned above the non-metallic material 74 of the lower slider 62 with the high density gap 66 of the lower slider 62 positioned below the non-metallic material 92 of the upper slider 80. Similarly the high density gap 86 of the upper slider 80 is positioned above the non-metallic material 72 of the lower slider 62 with the low density gap 64 of the lower slider 62 positioned below the non-metallic material 94 of the upper slider 80.

Additionally as can be seen in FIGS. 5 and 6, the low density gaps 64 and 84 are provided along a radial line 96 of the disc 38. The high density gaps, 66, 86, are provided along a line 98 which is parallel to the radial line 96, but skewed from radial line 98 by the angle alpha. Due to the fact that the low density gaps require a tighter azimuth control than the high density gaps, due to the large gap width of the low density gaps, it is highly advantageous in a preferred embodiment to have the low density gaps aligned along radial line 96 with the high density gaps displaced by an angle alpha therefrom. This displacement is, as indicated above, approximately a distance "x" which is specified so that the cores which define the read/write gaps do not overlap. Due to the smaller gap width of the high density gaps, azimuth alignment is not as important and thus positioning of such gaps displaced from a radial line 96 can be tolerated.

Tight azimuth angle control is essential for a low density gap when used with interchangable cartridges. On such cartridges, it is important that the bits be written consistently in a perpendicular manner. If the bits are written in an angled or skewed manner, the bits tend to erase each other or have other adverse effects.

Figure 7:
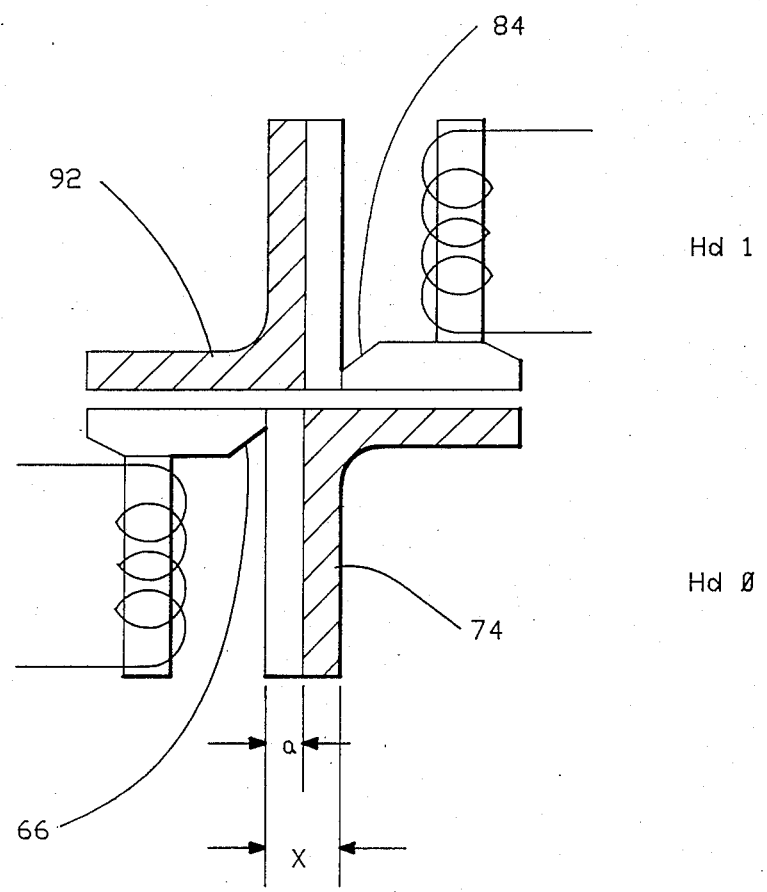
FIG. 7 is a side view of the gap of an upper slider with respect to a gap of a lower slider.

As can be seen in FIG. 7, a gap such as gap 84 of an upper slider is shown positioned adjacent a gap such as gap 66 of a lower slider. This distance "x" which is defined to ensure that there is no overlapping of the gap core is defined as twice the distance "a" which is the thickness of the legs of each core. The non-metallic material 92, 74 is also depicted in FIG. 7. In a preferred embodiment, the distance "a" is approximately 0.4 millimeters with the distance "x" being approximately 0.8 millimeters.

It is to be understood that in a preferred embodiment, with a low density gap there can be approximately 80 tracks on a 3½ inch floppy diskette. For the high density gap there can be approximately 318 tracks on a 3½ inch floppy diskette. The low density gap is capable of recording 1 to 2 megabites of data in the recordable data area defined by the 80 tracks while the high density gap is capable of recording approximately 10 megabytes of data in the 318 tracks defining the recordable data area.

Servo Format

Figure 8:
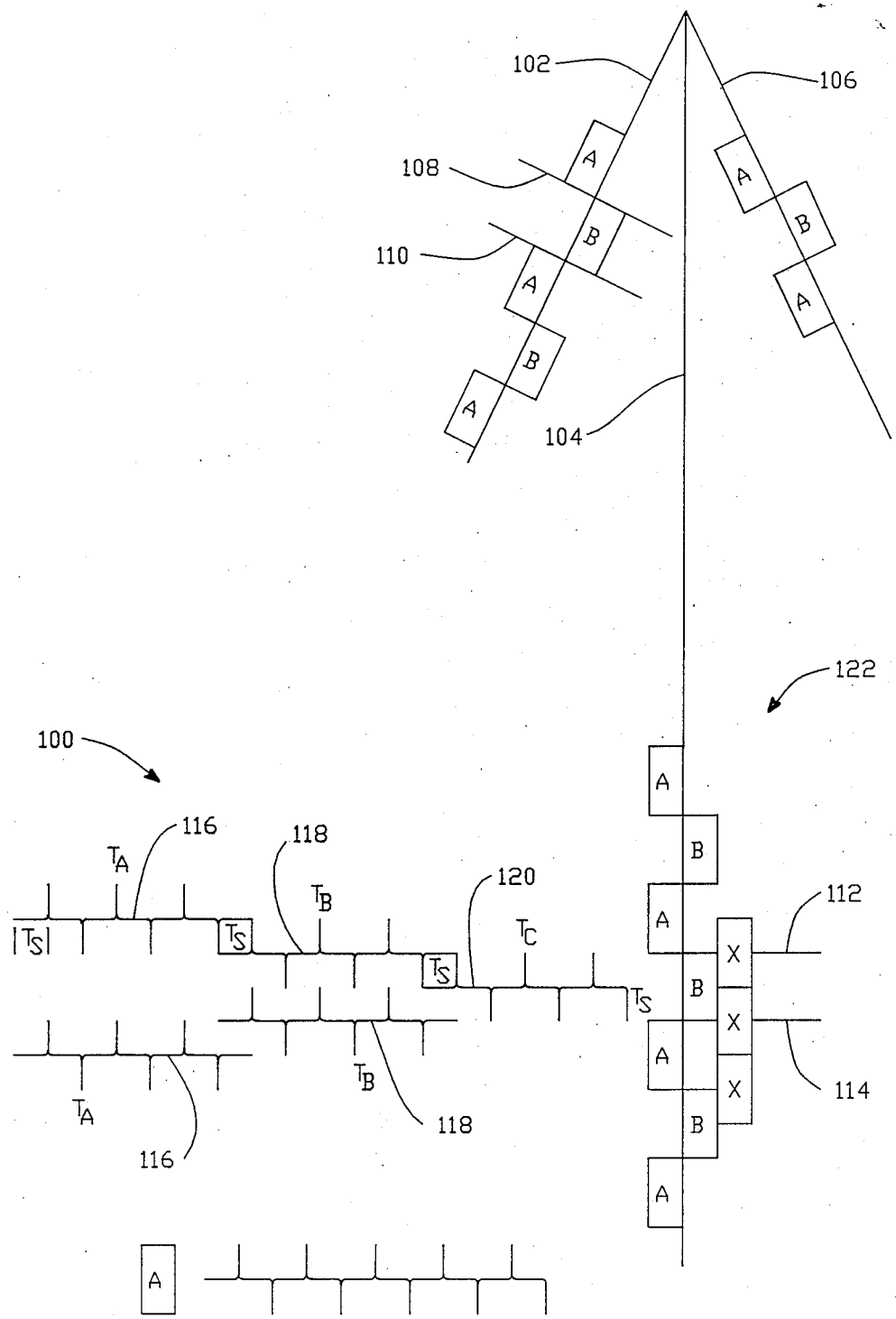
FIG. 8 is a schematical representation of the servo format of the invention.

The servo format 100 (FIG. 8) of the invention consists of a series of unique transitions (recorded bits) spaced in such a fashion so as to allow a sampling window 160 (FIG. 10) to open so that alignment patterns of transitions can be sampled in order to determine the centerline of a track onto which data is to be written to or read from. As can be seen in FIG. 8, the alignment patterns of transitions are identified by the A and B transition bursts which in a preferred embodiment include a transition burst of 18 equally spaced single frequency transitions all of the same amplitude. In a preferred embodiment, the A and B bursts are offset in time and alternate, first A, then B, then A again about a radial line such as radial lines 102, 104 and 106. Tracks such as tracks 108, 110, 112 and 114 are defined between the A and B bursts as indicated in FIG. 8. In prior art devices, a peak detector and sampling circuit would detect, sample and sum the A bursts and the B bursts as a read/write head traverses across the A and B bursts. If the sums are equal, the disc drive head is in the center of the track, such as track 108. If the sums are unequal, the head is not on the center of the track and must be repositioned.

In the preferred embodiment of the invention, additional transitions which include timing decode patterns of transitions are recorded ahead of the A and B alignment transitions. As can be seen in FIG. 8, a first timing decode pattern of transitions is recorded ahead of the A burst and has a datum or centerline which is colinear with the datum or centerline of the A burst. This first timing decode pattern of transitions is identified by the number 116 and the designation Ta. In a preferred embodiment, this pattern includes six timing decode transitions having a first frequency. A second timing decode pattern of transitions numbered 118, identified by Tb, follows the Ta pattern and has a centerline which is colinear with the centerline of track 112. The Ta and Tb transition patterns are spaced apart by time interval Ts. A similar time interval Ts preceeds the Ta timing decode pattern.

A third timing decode pattern 120, also identified by Tc, has a centerline which is colinear with the centerline of burst B, is spaced from the Tb pattern by time interval Ts, and is additionally spaced from the A burst by the same time interval Ts. In a preferred embodiment, it is to be understood that each of these timing decode patterns Ta, Tb, and Tc are comprised of six full transitions, each pattern having a different frequency, with the frequency of the Ta pattern being higher than the frequency of the Tb pattern which is in turn higher than the frequency of the Tc pattern. It is to be understood that in a preferred embodiment there are 18 servo sectors such as servo sector 122 which is associated with radial line 104 equally spaced circumferentially about the disc. Further it is to be understood that there is a Ta pattern associated with each A burst, a Tc pattern associated with each B burst and Tb pattern associated with the track defined between an A and a B burst. Thus the timing decode patterns of transitions Ta, Tb, Tc, as well as the alignment patterns of transitions extend in each servo sector radially from the outermost track adjacent the outer diameter of the disc, which can accept valid data, to the innermost track adjacent the spindle which can accept valid data.

Figure 10:
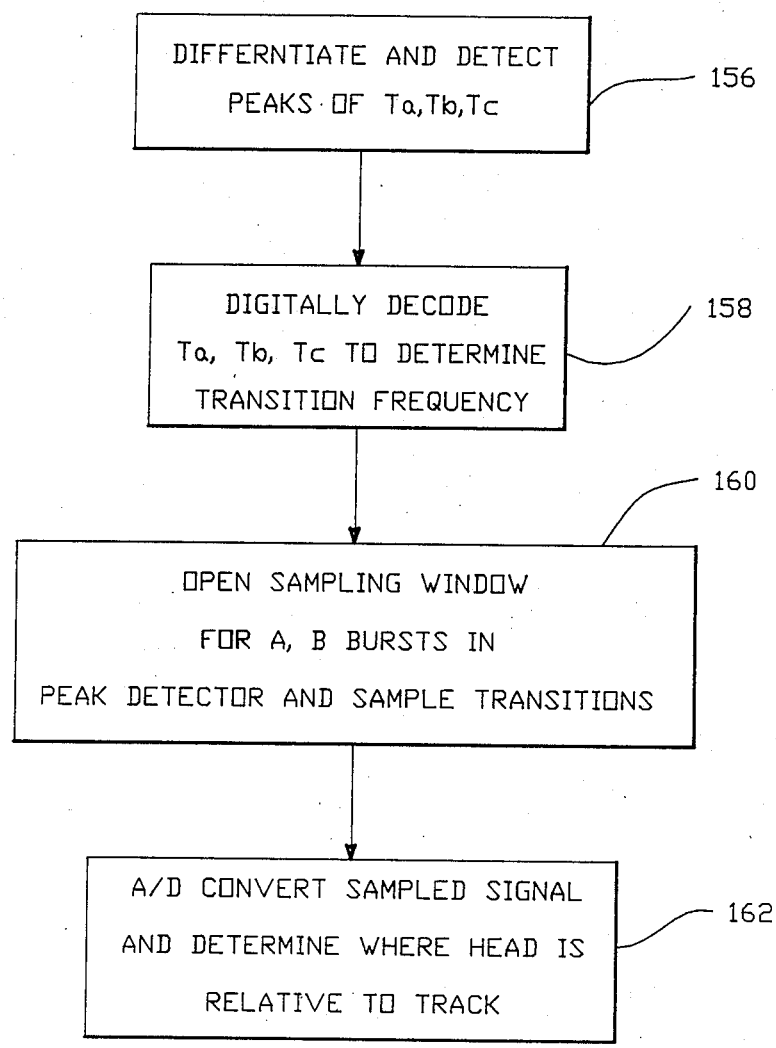
FIG. 10 is a flow chart representing the method for servo detection.

By detecting the frequency or timing of the Ta, Tb or Tc pattern the detector circuitry can determine how long it will be before a sampling window 160, FIG. 10, should be opened in order to sample the amplitudes of the A or the B bursts which samples are then used to accurately locate the head relative to the desired track.

Figure 9:
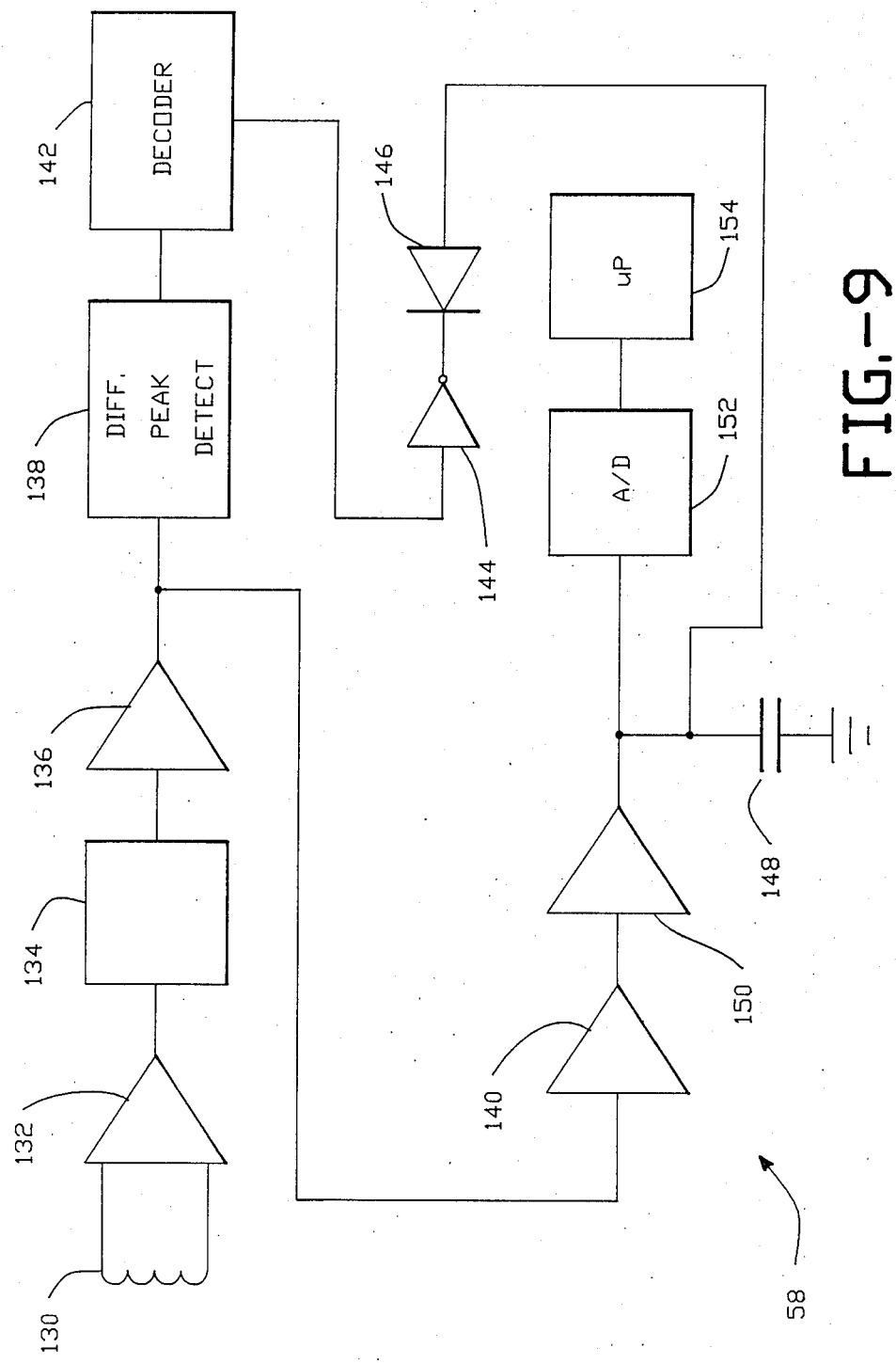
FIG. 9 is a schematic of the servo detector circuit of the invention.

The servo format detector circuitry 58 is more fully depicted in FIG. 9. In this circuitry 58, a head core and its associated read/write coil such as the read/write coil on head core 130 is associated with a preamplifier 132 and a filter 134. The output from the filter 134 is provided to an amplifier 136 and therefrom to a differentiator and peak detector 138 and to another amplifier 140. The output of the differentiator and peak detector 138 is provided to a digital decoder 142 and therefrom through an open collector driver 144 and a diode 146 to discharge a capacitor 148 which is associated with an amplifier of peak detector 150. The signal from the amplifier 140 is provided to peak detector 150. The output of peak detector 150 as sampled on the capacitor 148 is provided to an A to D converter 152 and therefrom to a microprocessor 154.

The servo format detector circuit 58 of FIG. 9 basically consists of digital logic which decodes the timing decode transitions Ta, Tb, Tc, 156, FIG. 10, and opens a window 160, FIG. 10, after a specified time interval, which interval is unique depending on whether the frequencies of the Ta pattern or the Tb pattern or the Tc pattern were detected. This information is decoded by digital decoder 142 (158, FIG. 10) in order to determine when the capacitor 148 can be discharged in order that the appropriate timing window for sampling can begin. When capacitor 148 is discharged, the peak detector 150 in conjunction with capacitor 148 can sample either an A burst or a B burst depending on which timing decode pattern was detected. Stated alternatively, the digital decoder 142 senses whether there is a Ta, Tb, or Tc pattern and discharges the capacitor 148 of the signal peak detector 150 after a preset time interval depending on which of the Ta, Tb, or Tc patterns are detected. The capacitor 148 is set up to charge again after the read/write head is in the first of the A or B burst region. The microprocessor 154 (162, FIG. 10) then reads the output of the A to D converter 152 after a prescribed time which allows for the output of the peak detector 150 to stabilize. The capacitor 148 is then again discharged in time, in order to set capacitor 148 up to sample the second alignment burst which is the other of the A or B burst. Then the microprocessor 158 uses the difference in amplitude from the A and B bursts to determine the position error and reposition the head on the centerline of the track.

It is to be understood that in the present embodiment that a single circuit is used to detect both the A and B bursts and thus all DC offsets characteristic of prior art devices in the servo circuit are eliminated. In prior art devices, separate parallel circuits, including an amplifier and peak detector, are used to detect the A bursts and the B bursts. Information detected is then compared to determine where the head is relative to the track. As each circuit may have a different DC offset, the offsets do not necessarily cancel each other and thus there is the possibility of an error in the determination of the location of the track as defined by the A and B bursts. This DC offset error is eliminated by using the single circuit of the present invention.

Field Servo Writing

Normally writing servo information on a blank disc media is accomplished in a factory environment through the use of a very precise and expensive servo writer. Existing servo writers use lasers to exactly position the heads of the servo writer so that servo information can be accurately recorded on disc. Such an operation is not only costly but also time consuming. The cost of the operation greatly increases the cost of the media which is sold for use with a disc drive.

In order to reduce the cost of in-factory servo writing, attempts have been made to provide for in-the-field in-drive servo writing by the customer. One attempt uses an index pulse to write a servo pattern. The index pulse in such devices triggers the writing of only a single servo pattern at a prescribed interval from the index pulse.

As indicated previously, the present invention provides for a multiplicity of servo patterns disposed circumferentially about the disc and radially from the outermost track which can receive data to the innermost track which can receive data.

As indicated above the servo writing method of the invention is done closed loop in the drive for the entire disc. The servo writing method uses the track profile of a head. That is to say that this method uses the continuous alignment patterns of transitions, bursts A and B, and a substantially identical intermediate alignment pattern of transitions, burst pattern X, which is later overwritten with a data format in order to provide in-drive servo writing.

Figure 11:
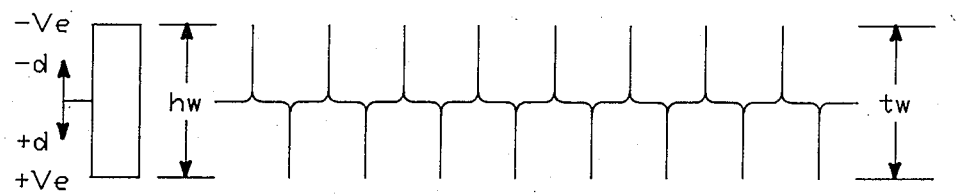
FIG. 11 shows a pattern of alignment transition.

FIG. 11 depicts an enlarged version of a alignment pattern of transitions, which is burst A, showing both track width ($t_w$) and head width ($h_w$). Also depicted is the head displacement (d) and the transition voltage value ($v_e$). Normally the head width is approximately equal to the track width except for fringing effects where the track width is slightly larger than a head width.

Figure 12:
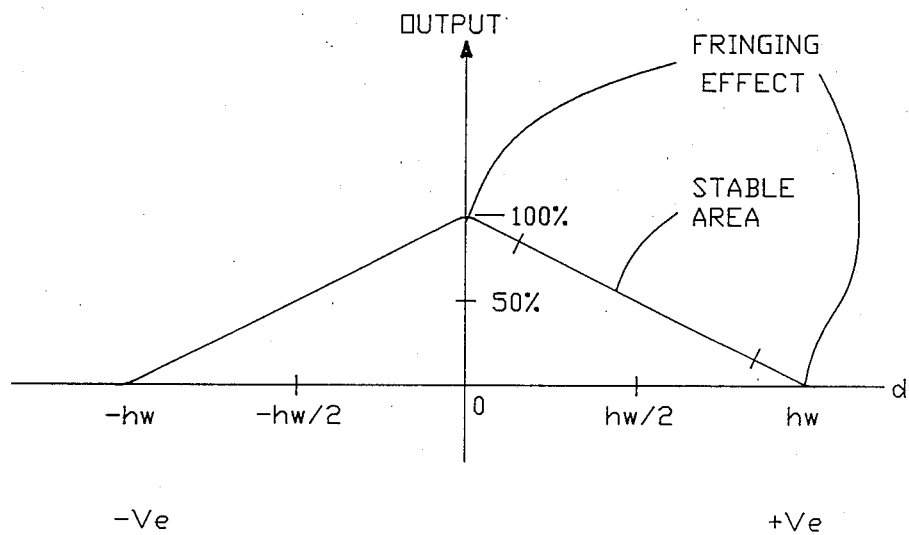
FIG. 12 depicts a graphical representation of the output of the detector circuit after having sampled the transitions of FIG. 11.
Figure 13:
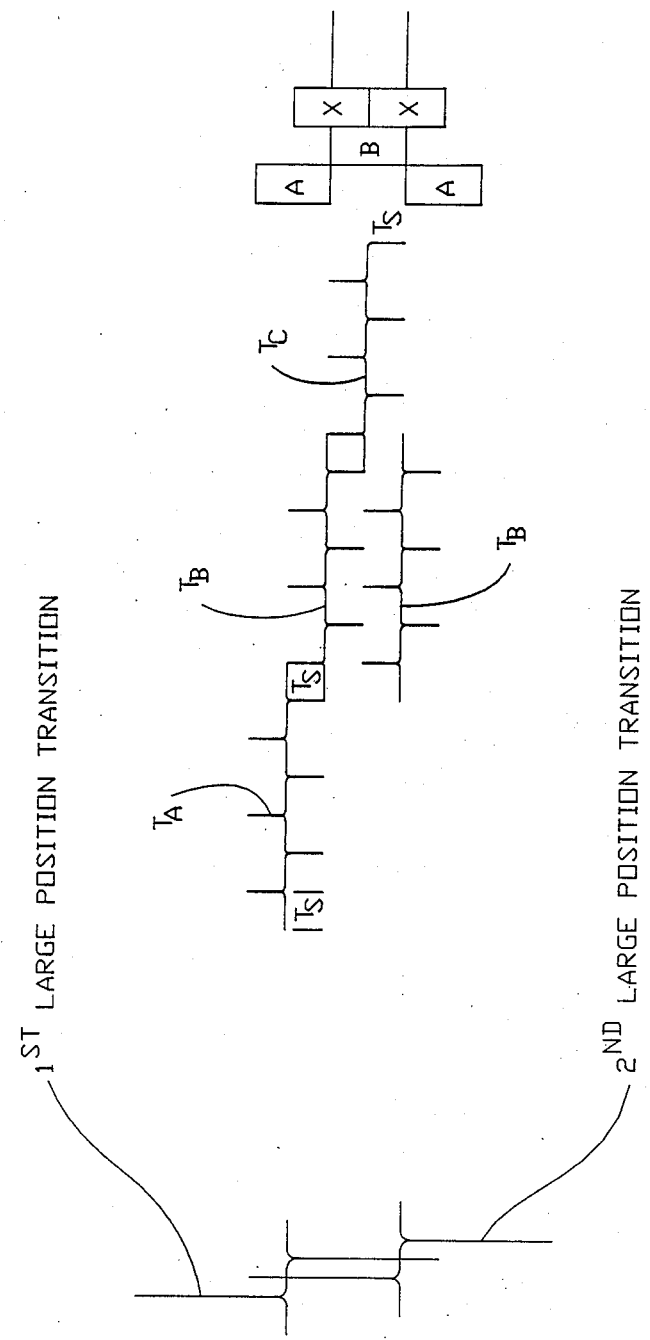
FIG. 13 depicts the use of low density transitions to servo format disc media.

FIG. 12 depicts the output of a peak detector which is the peak detector shown in FIG. 9 and how this output varies according to the displacement d from the centerline of the burst A. This output is essentially stable in a mid-range which does not include the fringing end effects. Thus the stable portion of this output can be used to guide the positioning of the read/write head for in-drive servo writing.

For in-drive servo writing, the read/write head, and in particular to the high density read/write gap, first writes a Ta pattern followed by a A burst. The head is then displaced a prescribed amount, which in a preferred embodiment is a distance of one half of a track, as determined by the amplitude of the A burst. The head then writes the Tb pattern followed by an intermediate alignment pattern, X burst, which intermediate pattern will eventually be overwritten to provide for a data format. The intermediate alignment pattern, the X burst, is then detected and sampled in order to reposition the head another half track and to write the Tc timing decode pattern of transitions and a B burst alignment pattern of transitions. This procedure is continued until all the servo information is written circumferentially along each track of the disc from the outermost track to the innermost track.

To solve the problem of the precise positioning of the servo format circumferentially around each track, the low density read/write gap is used. There are two approaches to using this low density read/write gap for the precise positioning of the pulses. It is to be understood that for both approaches, all the information written by the low density gap is subsequently erased as the high density gap continues to write the servo patterns. Further it is to be understood that the low density gap, being larger in width, allows for good peak detection of the signals before falling below the required threshold. When this occurs, another large positioning transition written by the low density read/write gap is written displaced from the first large positioning transition so that additional servo formats can be written on the disc.

Figure 14:
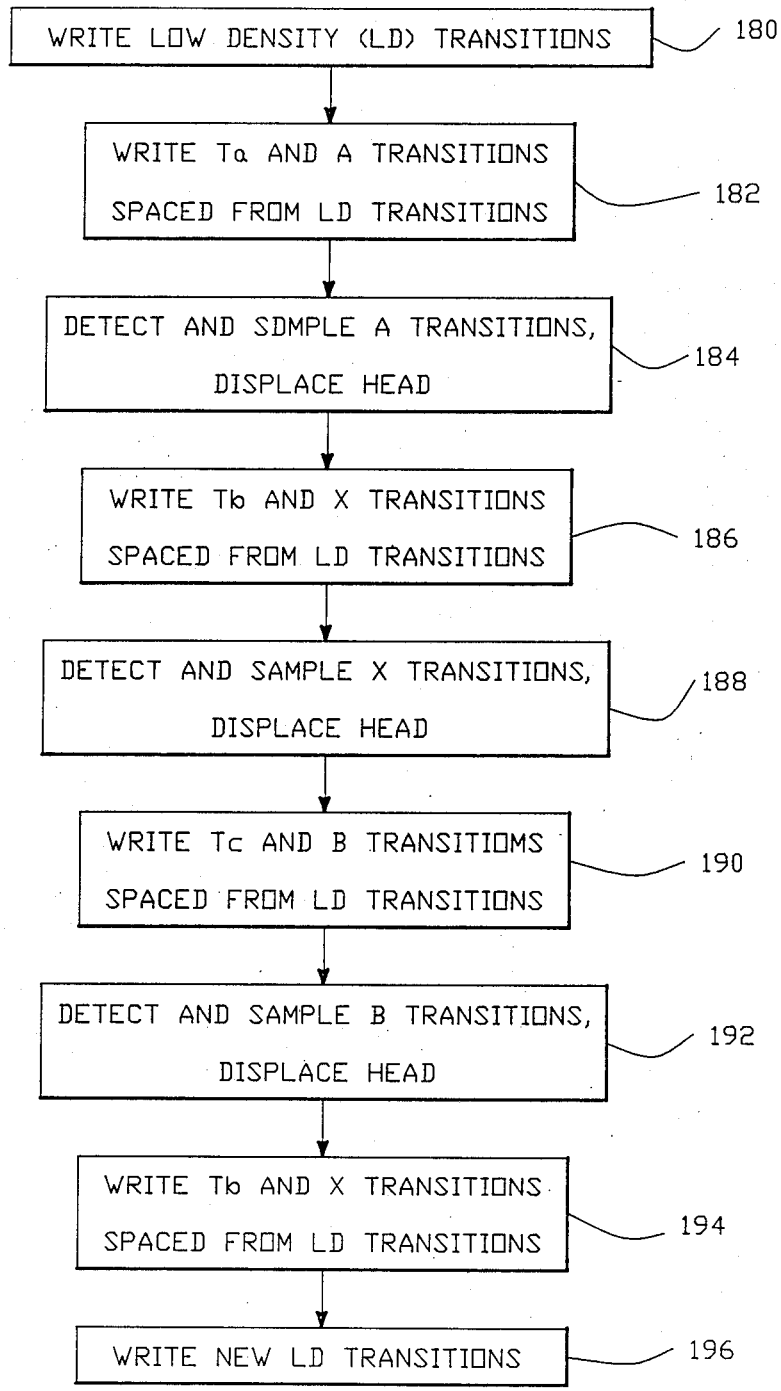
FIG. 14 depicts a flow chart representing the method for in-drive field servo formatting disc media.

The first method includes, in a preferred embodiment, writing eighteen large position transitions with the low density gap about the first track (180, FIG. 18). These transitions are substantially equally spaced; however, any variation in spacing is accounted for by the microprocessors so that all the servo information written using the large positioning transitions as a guide will be essentially equally spaced about the track. The next step (182, 184, 186, 188, 190, 192, 194, FIG. 14) is to write the timing decode transitions in the order of Ta, Tb, Tc and Tb, with the corresponding alignment transitions A, X, B, X. After the second X intermediate alignment transitions are written, the X alignment transitions are used to position the low density gap so as to write another series of large positioning transitions circumferentially about a track, which in a preferred embodiment would be spaced about one and one half track widths from the centerline of the first series of large transitions. This above procedure is repeated until all of the servo information has been written. In other embodiment the spacing can be greater or less than one and one half tracks depending on the width of the large positioning transitions.

Alternatively, a second method is to write the second series of large transitions using the first series of large transitions as a reference for positioning the second series of large positioning transitions.

Method For Write Updating Low Density Standard Media

Figure 15:
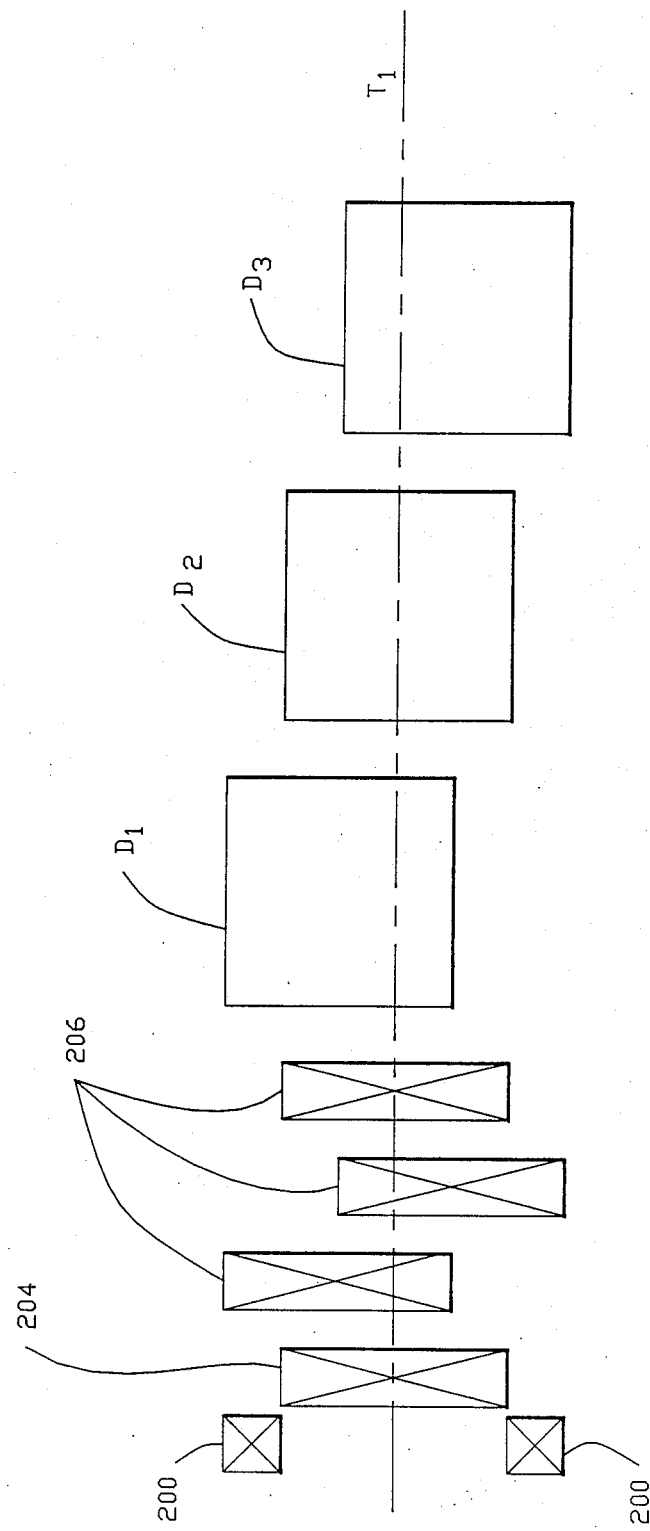
FIG. 15 depicts a representation of write updating of low density data using the drive of the invention.

There is presently a large installed base of low density floppy disc drives which can read and write on the order of one to two megabites of information on a standard 3½ inch, 80 track floppy diskette. The heads used to read/write and erase such a floppy diskette have sliders which are similar to the prior art slider shown in FIG. 1. That is to say that the slider includes a read/write gap and two side-by-side erase gaps. As is well known in the industry, the reason for this slider configuration is that prior art disc drives have open loop servoing which means that different data records written at different times and perhaps using different floppy disc drives on a single track may not all be exactly aligned along the centerline of the track. For example in FIG. 15, three data records, D1, D2 and D3 were written along track one, $T_1$, by three different prior art low density disc drives. As can be seen, each data record is slightly displaced from the centerline of the track $T_1$. In order to write update this track $T_1$ and these three data records, the two spaced apart erase gaps 200, 202 are used to erase the upper and lower fringe areas of the data records, where the data records extend more than half a track's width from the centerline of the track $T_1$. The low density head is then used to write update track $T_1$ by writing over the existing data.

Figure 16:
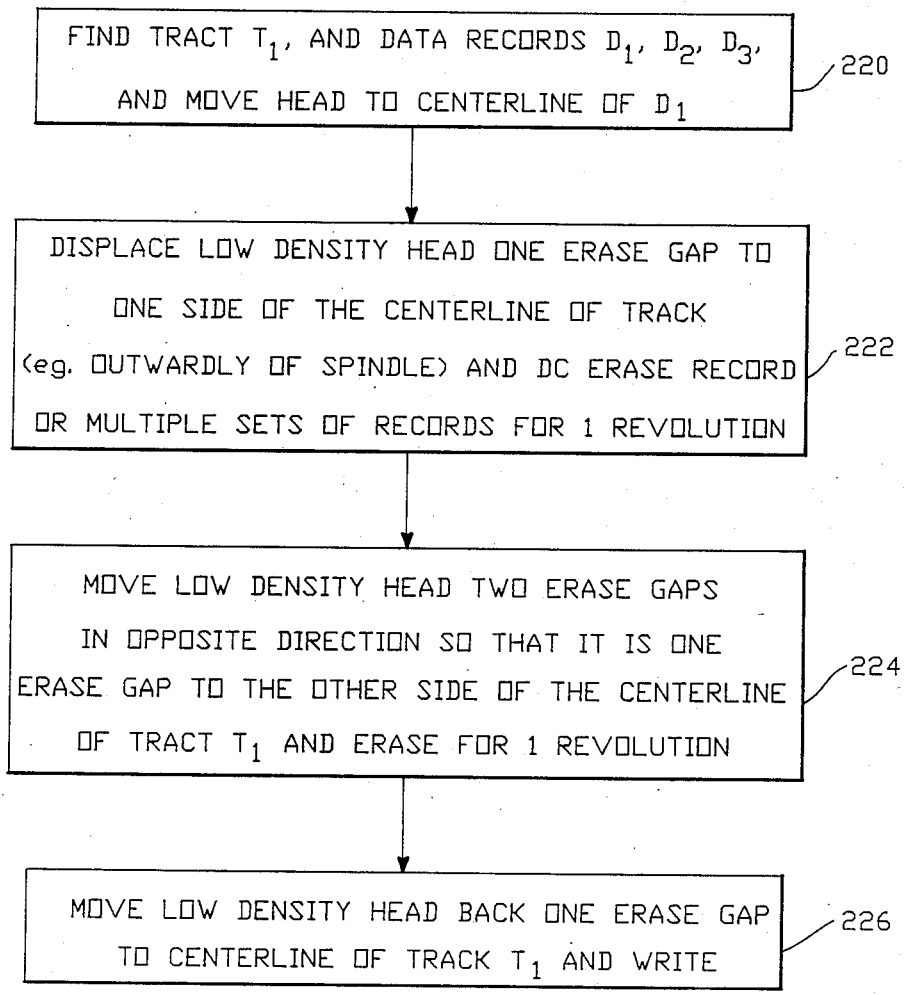
FIG. 16 depicts a flow chart representing the method of write updating standard open loop formatted data using the disc drive of the invention.

The present invention provides for using the low density head of the invention for performing the write update function in the following manner. First the track and data to be updated is located (220, FIG. 16). Then the low density head 206 of the disk drive of the invention is displaced by the width of one erase gap, of a prior art disc drive, to one side of the centerline of track $T_1$ and low density head 206 is used to then erase the portions of the selected data records that can be erased with the low density head so positioned (222, FIG. 16). Once this is accomplished, the low density head is repositioned by two erase gap widths in an opposite direction so that now it is one erase gap width to the opposite side of the centerline of the $T_1$ track and an erase operation is performed (224, FIG. 16). Next the erase gap is moved back one erase gap width so that it is now centered on the $T_1$ track and the data records are now updated with new data (226, FIG. 16). Thus in three revolutions, the present invention can write update standard media using its low density head 206. The updated information can then be read by the low density head 206 with just one revolution.

It is to be understood that a semiconductor buffer memory such as memory 60 in FIG. 2 can be associated with this procedure so that this buffer memory can be used to temporarily store information received at high speed from a microprocessor, in order to write update low density tracks, until the low density head can accomplish the three passes required to write update the information.

It is to be understood that for the high density gap that the buffer memory would in most cases not be used as this gap can write information on a high density floppy diskette at speeds appropriate to match that of the information coming from the microprocessor, or could be used to speed information transfer as a cache memory or as a look-ahead buffer memory to achieve even faster access timer realizing that semiconductor memories have much faster access times than disc drive devices.

Portable Floppy Diskette Drive With Buffer Memory

Although rigid disk drive devices are ideal for holding large amounts of information and affording rapid access time, their large power consumption requirement put them at a significant disadvantage for use in portable computer such as portable 230 in FIG. 2. Floppy diskette drives are used, even though they store less information and are slower because the discs therein spin intermittently as information is read from or written to the disc, and thus less power is required.

The present invention provides for a high density floppy disc drive with a look-ahead buffer memory such as memory 60 in FIG. 2. In this configuration, the data requested from the disc drive is provided to the portable microprocessor. Data located ahead of the requested data is then stored in the buffer memory in anticipation of that data next being required by the microprocessor. The floppy disc drive then shuts down conserving power. When additional data is needed, that data can be read from the buffer memory. Thus the combination of the high density floppy diskette with the buffer memory provides for rapid communication of data to and from the microprocessor and makes the high density floppy disc drive appear to be more like a hard disk drive than a standard formatted low density low disk drive in that it provides data at a much higher rate. However, advantageously, the disc drive of the invention consumes power at the lower rate of a standard floppy diskette.

Other advantages and objects of the invention can be obtained from a review of the appended claims and the figures.

It is to be understood that other embodiments of the invention can be provided and fall within the breadth and scope of appended claims.

I claim:

1. A method for a floppy disc drive in a computer for reducing power consumption and/or speeding data transfer, the method comprising the steps of:
 (a) providing a read/write head capable of reading data on a floppy disc;
 (b) providing a look-ahead memory buffer in the disc drive;
 (c) reading requested data and data ahead of the requested data from the disc by the read/write head;
 (d) storing the read data ahead of the requested data in the look-ahead memory buffer;
 (e) reading the stored data from the look-ahead memory buffer instead of the disc when a next requested data is the same as the data stored in the memory buffer; and
 (f) ceasing movement of the disc until reading of the data stored in the memory buffer is completed or until other data is requested that is needed directly from the disc.

2. A method for reducing power consumption and speeding data transfer of a floppy disc drive which includes a read/write head with a high density read/write gap and a low density read/write gap, the method comprising the steps of:
 (a) providing a look-ahead memory buffer in the disc drive;
 (b) reading requested data and data ahead of the requested data from the disc by the high density read/write gap of the read/write head;
 (c) storing, when using the high density read/write gap of the read/write head, the read data ahead of the requested data in the look-ahead memory buffer;
 (d) reading, when using the high density read/write gap of the read/write head, the stored data from the look-ahead memory buffer instead of the disc when a next requested data is the same as the data stored in the memory buffer;
 (e) ceasing, when using the high density read/write gap of the read/write head, movement of the disc until reading of the data stored in the memory buffer is completed or until other data is requested that is needed directly from the disc; and
 (f) storing, when using the low density read/write gap of the read/write head, additional data in the memory buffer preparatory to the data being written on the disc by the low density read/write gap of the read/write head.

3. The method of claim 2, further comprising, after step (f) the steps, of:
 (g) erasing portion of a selected data record on both sides of a track of the disc by the low density read/write gap of the read/write head; and
 (h) writing data to a selected data record of the disc from the look-ahead memory buffer by the low density read/write gap of the read/write head.

4. The method of claim 3, wherein the erasing step (g) includes the steps of:
 displacing the read/write head so far as the width of one erase gap of a side-by-side erase gap to one side of the centerline of a track of the disc;
 erasing a portion of a selected data record on the disc by the low density read/write gap of the read/write head;
 displacing the read/write head so far as the width of one erase gap of the side-by-side erase gap to the other side of the centerline of the track on the disc; and
 erasing a portion of the selected data record on the disc by the low density read/write gap of the read/write head.

5. The method of claim 3, further comprising, before writing step (h), the step of positioning the read/write head to a centerline of the track of the selected data record before writing.

6. The method of claim 2, further comprising, after step (f), the steps of:
 displacing the read/write head so far as the width of one erase gap of a side-by-side erase gap to one side of a centerline of a track of the disc;
 erasing a portion of a selected data record on the disc by the low density read/write gap of the read/write head for 1 revolution of the disc;

displacing the read/write head so far as the width of one erase gap of the side-by-side erase gap to the other side of the centerline of the track on the disc;

erasing a portion of the selected data record by the low density read/write gap of the read/write head for 1 revolution of the disc;

positioning the read/write head to the centerline of the track; and writing data to the selected data record on the disc from the look-ahead memory buffer by the low density read/write gap of the read/write head.

* * * * *